United States Patent
Bushman et al.

[11] Patent Number: 5,188,021
[45] Date of Patent: Feb. 23, 1993

[54] FRUIT JUICE AND PULP EXTRACTOR

[75] Inventors: Ronald C. Bushman, Brea; L. Bruce Alexander, San Marino; William E. Harris, Jr., Glendora, all of Calif.

[73] Assignee: Brown International Corporation, Covina, Calif.

[21] Appl. No.: 700,621

[22] Filed: May 15, 1991

[51] Int. Cl.$^5$ .................................. A23N 1/00
[52] U.S. Cl. ............................. 99/502; 99/504; 99/507
[58] Field of Search ............ 99/495, 501–509; 426/481, 489; 100/98 R, 108, 213

[56] References Cited

U.S. PATENT DOCUMENTS

| | | | |
|---|---|---|---|
| 1,888,528 | 11/1932 | Faulds | 99/502 |
| 1,888,529 | 11/1932 | Faulds | 99/502 |
| 2,065,271 | 12/1936 | Faulds | 99/502 |
| 2,270,007 | 1/1942 | McKinnis | 99/507 |
| 2,313,318 | 3/1943 | Brown et al. | 99/504 |
| 2,428,157 | 9/1947 | Healy | 99/504 |
| 2,551,156 | 5/1951 | Polk, Sr. et al. | |
| 2,570,071 | 10/1951 | Polk, Sr. et al. | |
| 2,630,849 | 3/1953 | Williams | 99/504 |
| 2,631,625 | 3/1953 | Wells | 99/504 |
| 2,686,541 | 8/1954 | Harden | |
| 2,705,984 | 4/1955 | Harden | |
| 2,737,989 | 3/1956 | Wurgaft | |
| 2,822,010 | 2/1958 | Harden et al. | |
| 2,848,025 | 8/1958 | Harden et al. | |
| 2,853,107 | 9/1958 | Alexander et al. | |
| 3,373,784 | 3/1968 | Holbrook | |
| 3,448,682 | 6/1969 | Rickard et al. | |
| 3,858,500 | 1/1975 | Rohm et al. | |
| 4,306,649 | 12/1981 | Berge | |
| 4,421,021 | 12/1983 | Holbrook | 99/501 |
| 4,479,424 | 10/1984 | Carroll | 99/502 |
| 4,729,299 | 3/1988 | Hatch | |
| 4,732,771 | 3/1988 | Bushman | |
| 4,759,938 | 7/1988 | Rohm | 426/481 |
| 4,937,088 | 6/1990 | Gosselin et al. | |

FOREIGN PATENT DOCUMENTS 1002119  3/1952  France ................ 99/502

Primary Examiner—Timothy F. Simone
Attorney, Agent, or Firm—Lyon & Lyon

[57] ABSTRACT

A rotary fruit and juice extractor has pairs of holding cups pivotally mounted to a rotating frame. A rotatable reamer is associated with each cup. Cams pivot the cups from a fruit loading position, to a fruit slicing position and then to a reaming position as the frame rotates. Reamer cams drive the reamers into and out of the fruit halves held within the cups as the frame rotates.

24 Claims, 11 Drawing Sheets

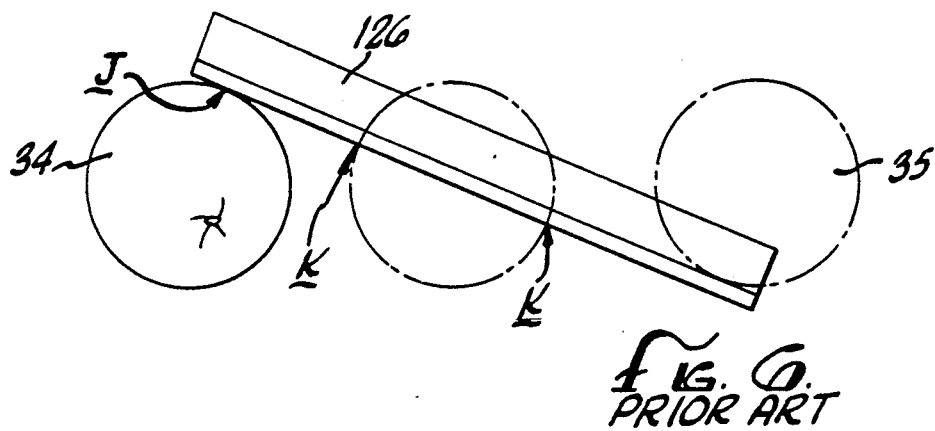
FIG. 6.
PRIOR ART
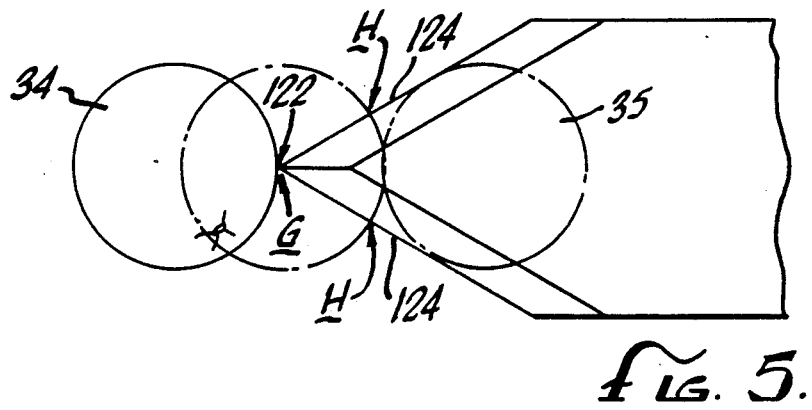
FIG. 5.
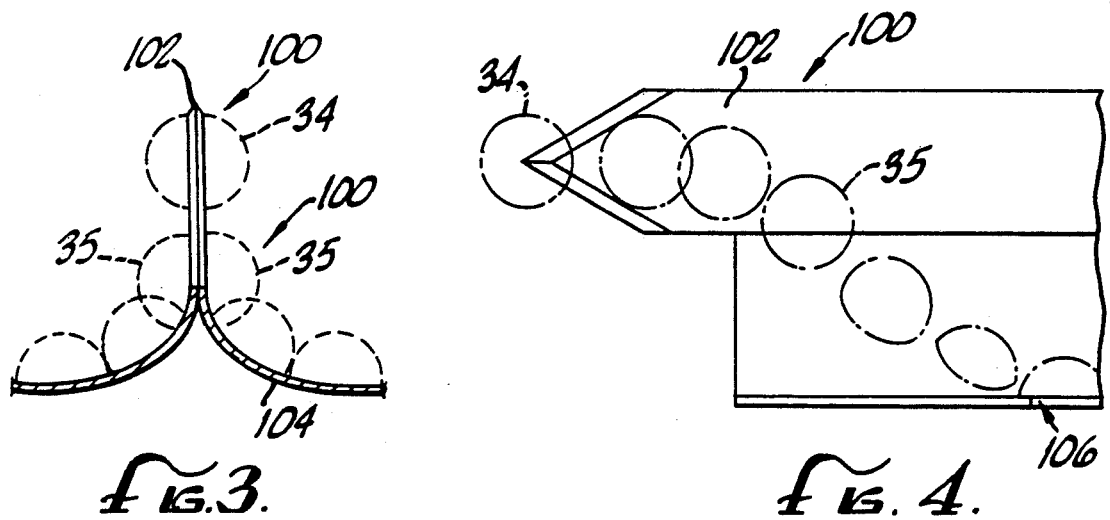
FIG. 3.
FIG. 4.

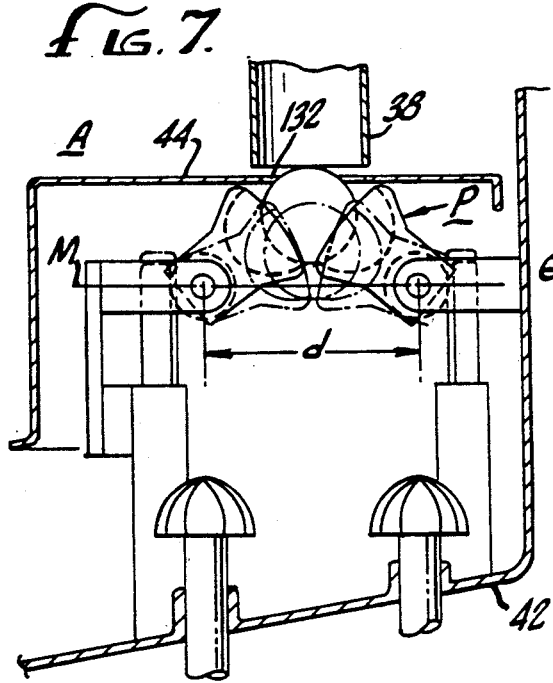
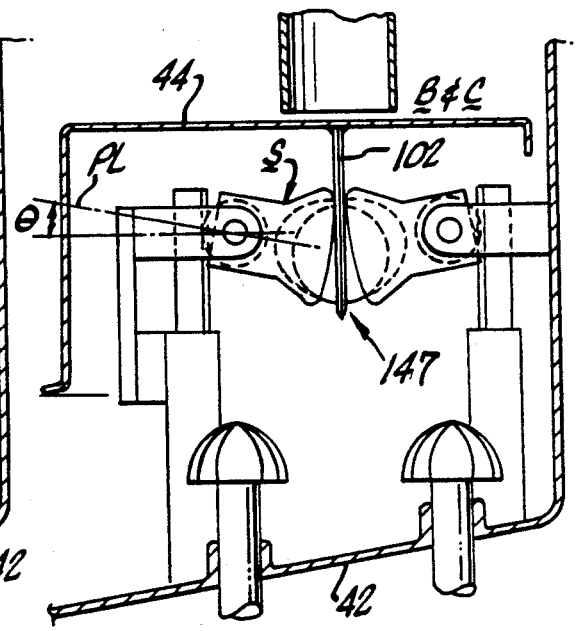
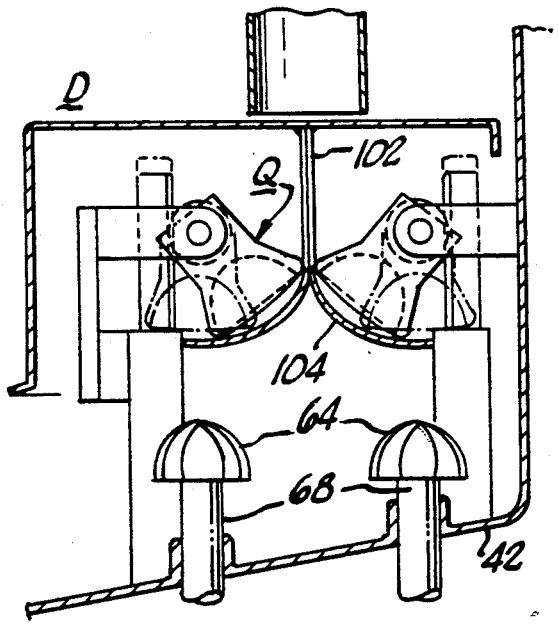
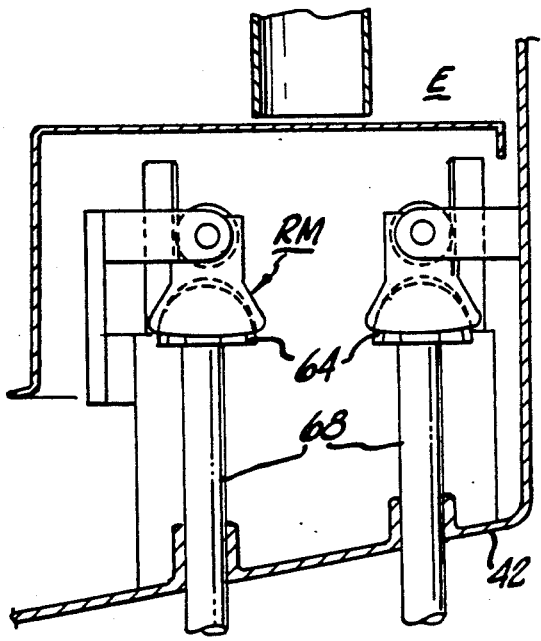

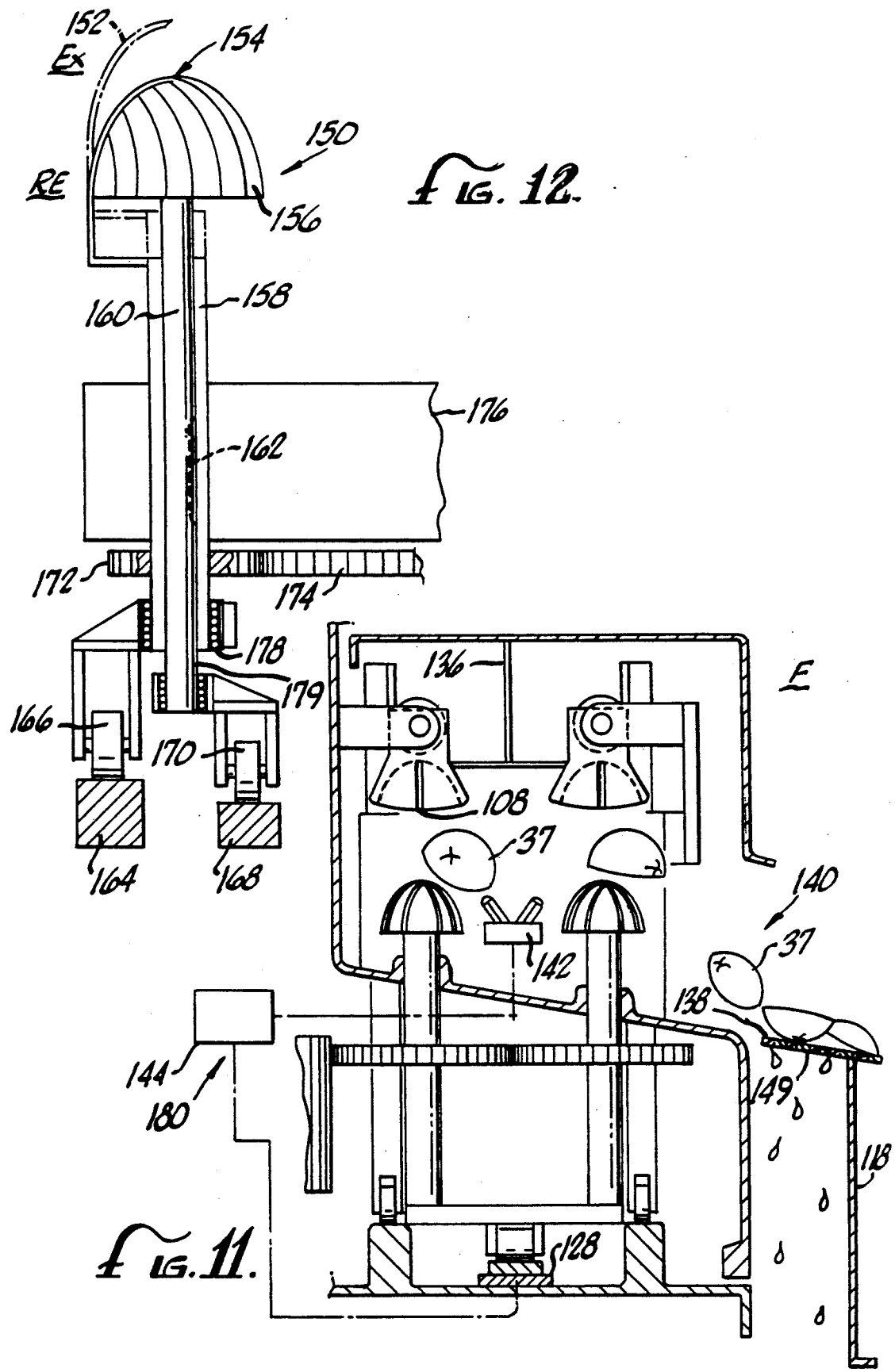

FRUIT JUICE AND PULP EXTRACTOR

BACKGROUND OF THE INVENTION

The field of the invention is fruit juice extractors.

In processing fruit, especially citrus fruit, to make fruit juices and other fruit products, the fruit pulp must ordinarily be accessed through the fruit peel or rind. Typically, this is achieved by slicing the fruit in half and then reaming, or by crushing the fruit pulp within the peel. However, the fruit peel generally contains bitter oils and other peel components which are undesirable in fruit juices or other fruit products. Accordingly, it is advantageous to avoid liberating peel oils and components during processing.

Deformation of, or excessive pressure applied to the peel increases the chances of liberating these undesirable peel components into the juice. These components can be released from the inside of the peel (albedo), as well as from the outside (flavedo). Some existing juice extractors can impart excessive pressures and high impact forces on the fruit peel. This has become a more significant problem in recent years as a result of the high operating speeds required by modern juice plants.

As harvested from orchards or farms, even a single load of fruit has a random assortment of fruit size, ripeness, peel condition, and other characteristics. This lack of uniformity can create difficulties in processing (e.g., handling, slicing, reaming, crushing, etc.) the fruit since the fruit processing machinery generally cannot be optimally matched for each random size or other fruit characteristic.

In many known fruit processing machines, the fruit is temporarily held in position by chutes, holders, cups, etc., for each particular operation. The fruit is then released and transferred to the next operation where the fruit is again secured or held in position by cups, cup fingers, etc., for further processing. The potential for improper handling of fruit generally increases with an increased number of holding and releasing steps.

With citrus fruit, the highest quality juice and the juice having the highest sugar ratio, is found in the fruit pulp closest to the peel. Hence, it is, of course, desirable to extract this highest quality juice from the fruit. On the other hand, this highest quality juice is difficult to extract from the fruit without liberating the above mentioned undesirable peel components, since the best juice and peel are adjacent to each other within the fruit.

Various fruit halving or cutting knives and methods have been known and used in the past with varying degrees of success. However, these known techniques can often liberate peel oils and other peel components which can be carried into the juice portion of the fruit.

SUMMARY OF THE INVENTION

It is an object of the invention to provide an improved fruit pulp and juice extractor which efficiently and securely handles fruit throughout fruit processing operations.

It is another object of the invention to provide a fruit juice extractor which extracts the high quality juice adjacent to the peel, without liberating peel oils.

It is yet another object of the invention to provide an improved fruit halving knife and method.

It is a further object of the invention to provide an improved coring type fruit extractor for extracting fruit cores intact.

It is another object of the invention to provide a combination slicer and reamer to slice pulp free of the peel and to ream any remaining juice bearing material.

It is a further object of the invention to provide a fruit juice extractor which automatically maintains proper fruit reaming depth.

Other and further objects, advantages and features will appear hereinafter.

To these ends, a rotary fruit juice extractor, in a preferred embodiment has a rotatably frame with a plurality of pairs of fruit holding cups pivotally mounted to the frame. Reamers aligned with the cups are also mounted on the frame. Cams are most desirably provided for sequentially pivoting the cups from a fruit-loading position, to a fruit-slicing position, to a fruit-reaming position, and then back to the fruit-loading position, with rotation of the frame. The reamers preferably advanced into fruit halves held within the fruit cups in the reaming position, by cams which advance and retract the reamers with rotation of the rotatable frame. The cams can be varied to achieve different reamer programs and dwell times. A gear drive system rotates the reamers apart from rotation of the frame. A rotary fruit magazine is advantageously positioned over and rotating with the frame has a plurality of feed chutes attached to the magazine, with one feed chute aligned with each pair of pivoting cups. A plurality of fruit juice fraction collecting sections are provided, in a preferred embodiment, around the extractor sectors where reaming occurs.

A fruit halving knife having a leading point is positioned to centrally engage and slice the fruit held in between the pairs of holding cups. The pivot axes of the cups is approximately 5° below horizontal, when in the fruit halving position, to automatically center the fruit within the pivoting cups. A fruit half retainer plate having reamer engagement slots is attached to the back of the halving knife.

A combination slicer and reamer has a generally hemispherical reamer attached to a rotatable reamer shaft. A slicer is attached to a rotatable slicer shaft around the outside of the reamer shaft. The slicer includes a radiused knife blade generally matching the curvature of the reamer. Cams attached to the slicer shaft and reamer shaft independently advance and retract the slicer and reamer. A drive gear system rotates the slicer shaft which is splined to the reamer shaft. In a preferred embodiment, the reamer includes a slot for accepting the slicer, so that the slicer can be retracted into the reamer and not interfere with reaming operations. The combination slicer and reamer first slices away the majority of the pulp and the reamer then reams the pulp remaining in the peel.

In another rotary fruit juice extractor embodiment, a rotor is rotatably supported within a housing, and a plurality of non-pivoting cups are circumferentially spaced apart on the rotor. Reamers are attached to the rotor in alignment with the cups. Cams move the reamers and cups together and apart. A halving knife and loading ramp are fixed to the housing, with the knife positioned in between the cups.

A fruit coring device has a pair of opposing cups with cup drivers for mutually advancing and retracting the cups. A capping knife slices off the fruit top and bottom. A coring knife has a cylindrical hollow opening and moves into the center of the fruit to extract the core of the fruit pulp in one piece. Preferably, a plunger within the coring knife is provided to remove the fruit core.

The cored fruit body is halved and ejected for further processing. The fruit coring device can be provided on a rotary frame as described above to make up a rotary fruit coring device.

BRIEF DESCRIPTION OF THE DRAWINGS

In the drawings, wherein similar reference characters denote similar elements throughout the several views:

FIG. 3 is an end view of the present halving knife of the invention;

FIG. 4 is a side elevation view fragment thereof;

FIG. 5 is an enlarged side view fragment of the halving knife;

FIG. 6 is a schematically illustrated side elevation view of a prior art halving knife;

FIG. 7 is a section view fragment taken along line 7—7 of FIG. 2;

FIG. 8 is a section view fragment taken along line 8—8 of FIG. 2;

FIG. 9 is a section view fragment taken along line 9—9 of FIG. 2;

FIG. 10 is a section view fragment taken along line 10—10 of FIG. 2; and

FIG. 11 is a section view fragment taken along line 11—11 of FIG. 2 with FIGS. 7-11 showing cup and reamer positions as the extractor turns through positions A through F in FIG. 2;

FIG. 12 is an enlarged side elevation view fragment of a combination slicer and reamer;

DETAILED DESCRIPTION OF THE PREFERRED EMBODIMENT

Figure 1:
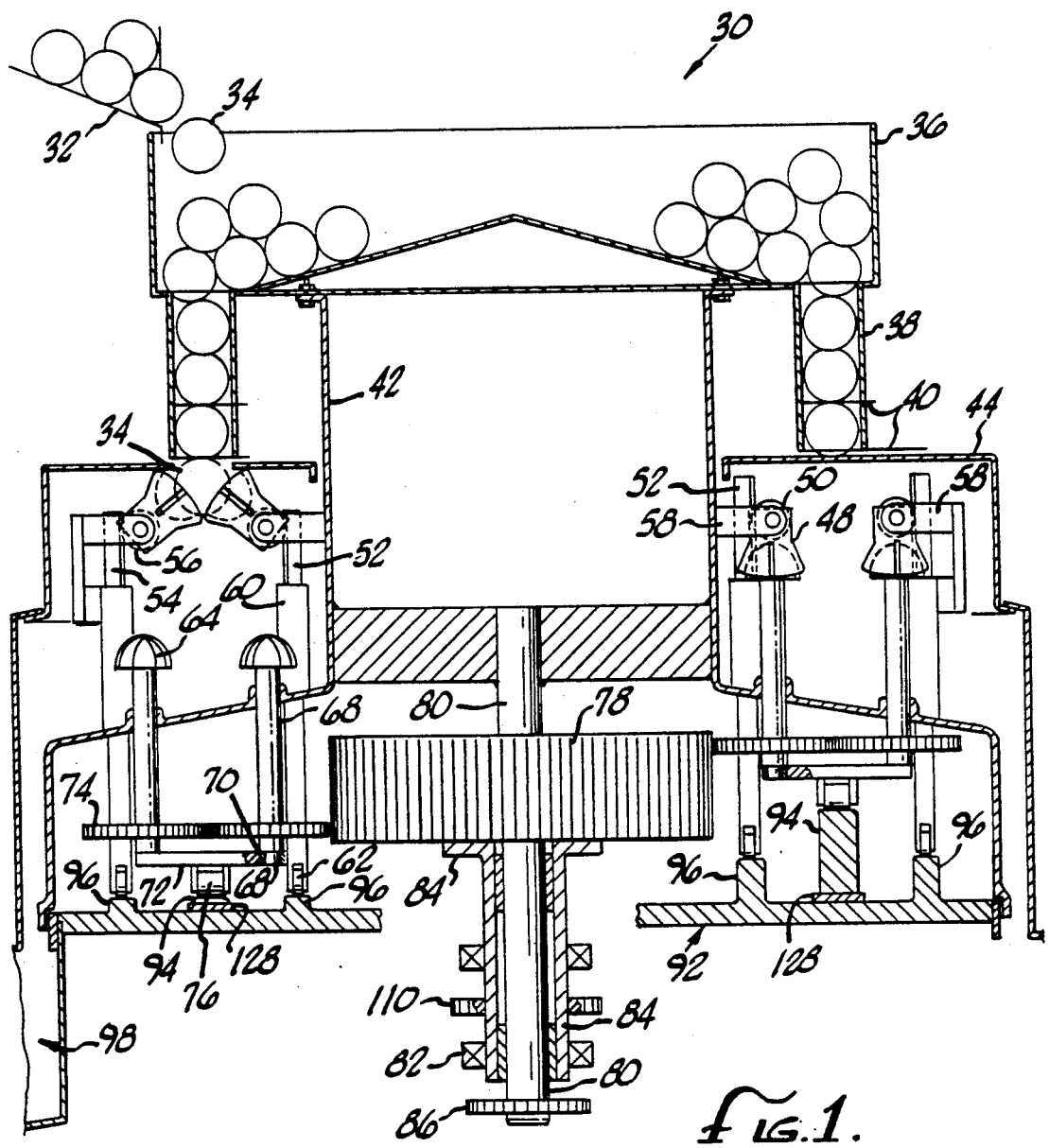
FIG. 1 is a side section view fragment of the present rotary fruit juice extractor.

Turning to the drawings, as shown in FIG. 1, a fruit juice extractor 30 has a hopper 36 attached to a rotary frame 42. Fruit 34 are provided from a feed chute 32 into the hopper 36. The hopper 36 has tubular magazines 38 equally spaced apart about its circumference. With a hopper of approximately 36 to 42 inches in diameter, preferably 24 tubular magazines 38 are provided. Within each tubular magazine 38 is an escapement 40 to regulate the fruit flow or movement through the magazines. The escapement 40 allows one fruit to pass out of the lower end of the tubular magazine 38 with each revolution of the extractor 30. A housing 44 and juice trough 46 are provided around the lower circumference of the rotary frame 42.

A pair of pivoting cups 48 is associated with each tubular magazine 38. Preferably, the cups 48 are made of a resilient material to cushion the fruit. Ridges or grooves are provided on the inside surface of the cups 48 to prevent the fruit from spinning within the cups 48 during reaming. Allowing fruit to spin in the cups would tend to disadvantageously release peel oils.

Each cup 48 is mounted on a pivot pin 50 supported by an armature 58 attached to the rotary frame 42. Referring momentarily to FIG. 7, the inner and outer cup 48 of each pair of cups are preferably identical and are centered horizontally below the magazine 38 with cup pivots on the same horizontal centerline M. Referring once again to FIG. 1, a drive rod 52 has a rack segment 54 engaging a pinion segment 56 at the back of each cup 48. The drive rods 52 are supported through drive rod supports 60 passing through the rotary frame 42. Rollers 62 at the lower end of the drive rods 52 roll on cup pivot cams 96 on a cam base plate 92 fixed to the stationary housing 44.

A reamer 64 is aligned and associated with each cup 48. Each reamer 64 is supported on a reamer shaft 68 passing through the rotary frame 42. Gears 74 are attached to the reamer shafts 68, with the inner reamer shaft gear engaging a sun gear 78 and also meshing with a like outer reamer shaft gear. The reamers 64 and shafts 68 are grouped in pairs to match the pairs of cups. The lower ends of each pair of reamer shafts 68 are secured to a shaft plate 72 through bearings 70. A cam roller 76 under each shaft plate 72 rolls on a reamer advance cam 94 supported by cam elevators 128 on the cam base plate 92. A sun gear drive shaft 84 is attached to the sun gear 78. The shaft 84 is supported within the housing 44 by bearings 82. The cam elevators 128 are positioned under the reamer advance cam 94 and are linked to a processor 144 and an optical color detector 142 which form a system for maintaining reaming depth, as shown in FIG. 11.

The reamer advance cam 94, as well as the cup pivot cams 96 are circumferentially formed about the center of cam base plate which also corresponds to the center of rotation of the frame 42. The cams 94 and 96 have "lobes" or relatively raised portions about their diameters, for controlling the vertical movement of the cup drive rods 52 which pivot the cups 48, and for controlling the advance and retraction of the reamers, respectively. The left side of FIG. 1 shows the cup pivot cams 96 and reamer advance cam 94 at low points such that the cups are pivoted upwardly (loading position) and the reamers are retracted. The right side of FIG. 1 shows the highest points on the cams with the cups 48 driven to a face down (reaming) position and the reamers 64 fully advanced or extended. The weight of the components keeps the cam follower rollers 62 and 7 in constant rolling contact with the top surface of the fixed cams 94 and 96.

A frame drive shaft 80 passes through clearance holes in the sun gear 78 and sun gear drive shaft 84 and rotatably supports the frame 42. The frame 42 is driven through a frame drive gear 86 linked to an electric motor. The sun gear 78 is driven by drive gear 110 linked to another motor or drive source such that the sun gear 78 and rotary frame 42 are separately rotatable at different speeds. While the extractor could operate with the sun gear fixed in position (i.e. with a single motor or drive source) since the frame 42 preferably spins at approximately 30 R.P.M., the reamers 64 would generally spin below the preferred known reaming speeds for most fruit. Juice chutes 98 are provided to channel juice from the juice pans 46.

Figure 2:
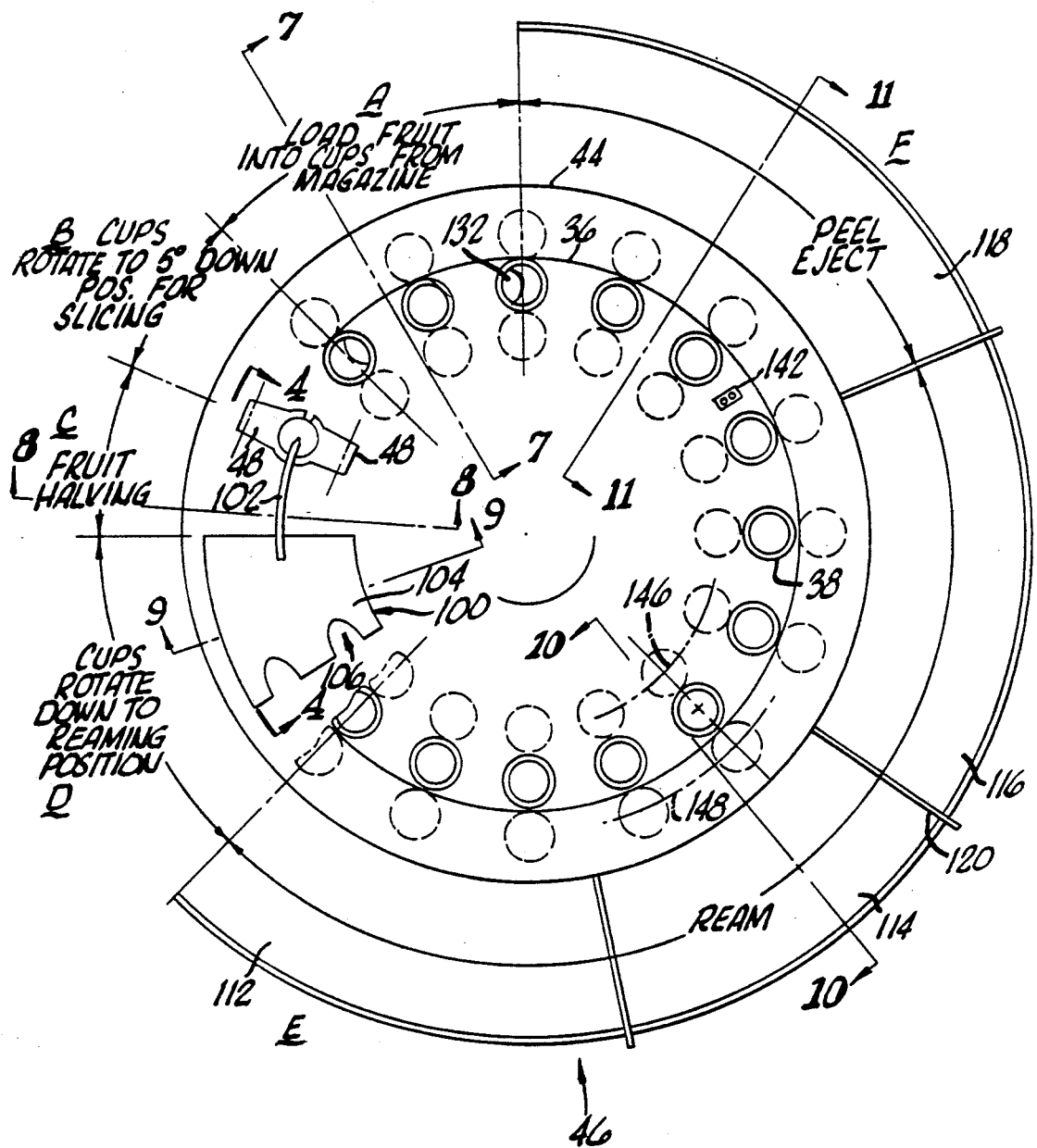
FIG. 2 is a schematically illustrated top view thereof.

Turning to FIGS. 2-5, a halving knife assembly 100 includes a halving knife 102 and a fruit half retainer plate 104. The halving knife 102 has a knife center point 122 and diverging knife edges 124. The halving knife assembly 100 is attached to the housing 44 in between the inner cup circle 146 and outer cup circle 148 of pivoting cups 48. The knife center point 122 is positioned to generally engage the center of the fruit 34 as the frame 42 rotates. As best shown in FIG. 2, the fruit half retainer plate 104 has reamer engagement slots 106 extending into its back surface. Also shown in FIG. 2 are first, second and third juice fraction pans 112, 114 and 116 which are separated by pan dividers 120 along the reaming sectors of the perimeter of the extractor 30. A peel eject juice pan 118 is provided adjacent to the third juice fraction pan 116.

Turning to the operation of the rotary fruit juice extractor 30, with reference to FIGS. 1, 2 and 7, fruit 34 is loaded into the hopper 36 which rotates with the frame 42 within the fixed housing 44. The fruit 34 moves via gravity into the tubular magazines 38. The escapement 40 allows a single fruit to fall through the tubular magazine 38 with each revolution of that magazine into the fruit loading sector of the extractor 30, generally designated at A in FIG. 2. As the magazine moves through the fruit loading sector A, the cups 48, fixed in polar position with respect to the magazine 38, are pivoted to an upfacing fruit loading position P to accept a fruit from the magazine 38. The radial spacing d of the cup pivot centers is determined by the size of fruit to be processed and the cup size and style.

The pivoting movement of the cups 48 is achieved by the cup pivot cams 96 forcing the drive rods 52 upwardly as the rollers 62 ride around the cup pivot cams 96. The rack 54 on each drive rod 52 meshes with the pinion segment 56 on each cup 48, causing each cup to pivot about a pivot pin 50. The fruit 34 is released by the escapement and falls from the magazine 38 through slot 182 in housing 44 into the pair of cups 48 aligned with the magazine. Since the hopper 36 and cup pairs 48 are moving together, there is no relative movement between them.

Referring to FIGS. 2 and 8, as the frame 42 continuously turns, the cups 48 next start to rotate downwardly to encompass and hold the fruit 34, again under the control of the cup pivot cams 96 driving the drive rod 52 and rack and pinion segments 54 and 56. As the cups approach the halving knife 102 (sector B in FIG. 2), they are positioned slightly downwardly. Specifically, the axis of each cup PL as shown in FIG. 8 in this slicing position S are angled approximately 5°-10° below horizontal. In this position, a small gap 147 is formed between the facing cups 48. The fruit falls into the gap 147 and automatically centers itself. The gap 147 is deep enough so that the fruit is not affected by centrifugal force (approximately 0.5 g's at 30 rpm for a 36 inch diameter hopper) generated by the rotation of the frame 42. The point 122 of the halving knife 102 is vertically positioned below the cup pivot centerline M, to engage the center of the fruit after the fruit has dropped into the gap 147. The cups 48 pass by the halving knife 102 and the fruit 34 is sliced into fruit halves 35 in sector C of FIG. 2, and as shown in FIG. 4. The halving knife 102 has a radial curvature, as shown in FIG. 2, such that it slices through the fruit on a curved path. This slightly curved halving of the fruit does not effect the fruit processing.

After halving, as the cups 48 move with rotation of the frame 42 through sector D in FIG. 2, they pivot downwardly once more, again driven by the cup pivot cam 96, drive rod 52, and rack and pinion segments 54 and 56. The fruit halves 35 are very briefly held within the cups 48 against the fruit half retainer plate 104, as shown in FIGS. 3 and 4 and especially FIG. 9. (For clarity of illustration, the cups 48 are not shown in FIGS. 3 and 4.)

As the cup pairs 48 enter to sector E with the continuous rotation of the frame 42, they have been pivoted fully downwardly into the ream position RM and are engaged by the reamers 64 as shown in FIG. 10. The reamers 64 gradually rise through sectors D and E as the cam rollers 76 on the reamer shaft plates 72 roll on the reamer advance cam 94. The reamers 64 continue to rise through the reamer engagement slots in the fruit half retaining plate 104 and engage the fruit halves 35 as they move into sector E.

The reamer advance cam 94 can be designed to provide a linear single speed reamer engagement into the fruit halves. With this type of reaming, juice reamed from the initial penetration will collect in the first fraction pan 112, juice reamed from the middle of the pulp of the fruit halves 35 will collect in the second juice fraction pan 114, and juice reamed from the pulp closest to the peel will collect in the third juice fraction pan 116. These separate juice fractions having different characteristics can then be drawn off for further processing, mixing or packaging. The reamer advance cam 94 can also be designed for other types of reamer engagement, to produce different juice fractions. For example, the reamer could undergo a quick initial engagement of the fruit half 35, with a slower engagement as the peel is approached. Alternatively, the reamer 64, as controlled by the reamer advance cam 94 could undergo a slow initial approach, a quick advancement through the center portion of the fruit half 35, and then a slow approach once more towards the peel. The reamer advance cam can also provide a dwell at the point of maximum reaming. Various other reamer advance programs can be accomplished by appropriate configuration of the reamer advance cam 94. These various advance programs can all be accomplished as a result of the relatively long path available for the reaming operation.

Referring to FIGS. 2 and 11, as the cups 48 move from the reaming sector E to the peel eject sector F, the reamers 64 are withdrawn from the cups 48. The fruit peels generally remain in the cups at this point. An optical color sensor 142 detects the color of the inside of the passing reamed fruit peels 37. The optical color sensor 142 is linked to a processor 144 which preferably is programmed with a target color range. The optical color sensor, under the control of the processor, reads the reamed fruit half color from several fruit peels. A position sensor may be provided to supply timing pulses to the processor, so that the processor can determine the proper intervals for reading color inputs from the color sensor.

The processor 144 compares the detected color with the target color range which is preferably selected somewhere in between an "over-reamed" white peel color and an "under-reamed" orange colored peel cavity. If, after sensing several peel cavities, the detected color is sufficiently over or under the target color range, the depth of reamer penetration into the fruit halves is automatically readjusted to an optimum by selectively adjusting the position of the cam ring plate 92 through cam elevators 128. The optical color sensor 142, processor 144 and cam elevators 128 are thus linked together to form a system 180 for automatically maintaining proper fruit reaming depth.

In reaming type juice extractors, a change in peel thickness has a significant effect on the quantity and quality of the juice removed during reaming. Peel thickness can vary over a wide range in loads of fruit from different geographic areas. Thick-skinned fruit will usually undergo excessive reaming, with all juice and membrane being removed, leaving only white albedo exposed inside the reamed fruit half. On the other hand, thin-skinned fruit will not be reamed as thoroughly, leaving some juice bearing pulp material in the fruit half. Nevertheless, the foregoing system 180 can provide proper reaming for both thick skinned and thin skinned fruit.

Referring once again to FIGS. 2 and 11, as the cups 48 move further into the peel eject sector F, they pass over a peel ejector 136. The peel ejector slots 108 in the cups 48 provide clearance for the ejector 136. The peel ejector 136 is preferably a wire bar or prong attached to the housing 44. The peel ejector 136 strikes the peels 37 and causes them to fall out of the cups 48. A wire grid 149 covers a peel eject juice pan 118 which collects whatever juice falls away from the peels 37. The peels 37 pass through a peel chute 140 and are removed from the extractor 30. The design shown in FIG. 1 rotates at approximately 30 rpm and processes about 720 fruit per minute.

In FIGS. 1, 2 and 7-11, all components shown spin with the frame 42, except for the chute 32, housing 44, juice pans 112, 114, 116, peel eject juice pan 118, grid 149, dividers 120, cam base plate 92, halving knife assembly 100, peel ejector 136, and the system 180 for automatically maintaining reamer engagement depth, including the optical sensor 142. The embodiment of FIG. 1 can also be modified into a fixed frame extractor. In such a modified embodiment, the frame cups, reamers and magazines remain in a stationary non revolving position. The knife assembly, cams, conical center section of the hopper, peel ejector and optical color sensor revolve about or within the frame. The operation of the fixed frame embodiment is similar to the rotating frame embodiment of FIG. 1, although collection of separate juice fractions would require revolving juice collection pans.

Referring to FIGS. 5 and 6, in known juice extraction machines, fruit is typically cut in half with a halving knife, prior to juice extraction. These known halving knifes are generally of the blade and cutting configuration 126 shown in FIG. 6. At point J in FIG. 6, the cutting force is high as the flat edge of the knife blade 126 breaks through the peel. From point J to points K in FIG. 6, i.e., halfway through the fruit, peel oils and other peel components are forced into the pulp or juice area of the fruit, potentially degrading juice quality.

With the present knife shown in FIG. 5, at point G where the knife point 122 first enters the fruit 34, the puncture force is extremely low, such that there is a minimal tendency to liberate peel oils. From point G to points H in FIG. 5 (an arc on the fruit of perhaps only 60°) the knife forces are from the outside towards the inside. From points H to the completion of the cutting, the knife forces are from the inside to the outside. Accordingly, the present halving knife as shown in FIG. 5 tends to force peel oils and components away from the fruit pulp during most of the halving cycle. This helps to prevent undesirable peel components from entering the pulp from which juice will be subsequently extracted.

A combination slicer and reamer 150 as shown in FIG. 12 can be used in a rotating extractor, or in other applications or machines. The combination slicer and reamer 150 has a radiused slicing knife 152 attached to a knife drive tube 158. The knife drive tube 158 is rotatably supported by a rotary frame 176 or some other structure. A knife shaft gear 172 is attached to the knife drive tube 158 and mates with a drive gear 174. A knife cam follower 166 supported on the knife drive tube 158 through a bearing 178 rides on a knife cam 164.

A reamer 156 is supported on top of a reamer shaft 160 which extends through the knife drive tube 158. A spline 162 slidably connects the reamer shaft 160 to the knife drive tube 158. A reamer cam follower 170 is attached to the reamer shaft 160 through a bearing 179. The reamer cam follower 170 rides on a reamer cam 168. The reamer 156 has a knife slot 154 to accept the slicing knife 152.

In operation, a fruit is held in position, for example in a cup 48 of an extractor 30, above the reamer 156. The knife cam 164 and reamer cam 168 are arranged so that the slicing knife 152 first advances, from the retracted position RE to the extended position EX, into the fruit (not shown), with the reamer 156 remaining in position. As the slicing knife 152 advances into the fruit, it slices into and removes most of the fruit pulp, with a spiraling inward cut. The pulp falls away for collection. The curvature of the slicing knife 152 is generally set to match the curvature of the fruit. After slicing, the slicing knife 152 returns from the extended position EX to the retracted position RE, as shown in FIG. 12. In the retracted position RE, the slicing knife 152 is withdrawn into the knife slot 154 and does not protrude above the profile of the reamer 156.

The drive gear 174 is turned by a motor or other drive source, which in turn drives the knife shaft gear 172 and causes the knife 152 to spin. The knife drive tube 158 drives the reamer shaft 160 through the spline 162, so that the slicing knife 152 and reamer 156 spin together, although they advance and retract or axially apart from each other.

The reamer cam 168 then advances the reamer 156 into the fruit to ream juice from remaining pulp not sliced away by the slicing knife 152. The juice falls to collection points (not shown) for separation and removal from the machine.

While the embodiment shown in FIG. 12 contemplates use of the combination slicer and reamer in a rotary machine in a vertical position as shown, other uses and positions may also be preferred. For example, the combination slicer and reamer can also be oriented horizontally or off vertical and springs can be added to tension the knife drive tube 158 and reamer shaft 160 against the knife cam 164 and the reamer cam 168, respectively.

Figure 13:
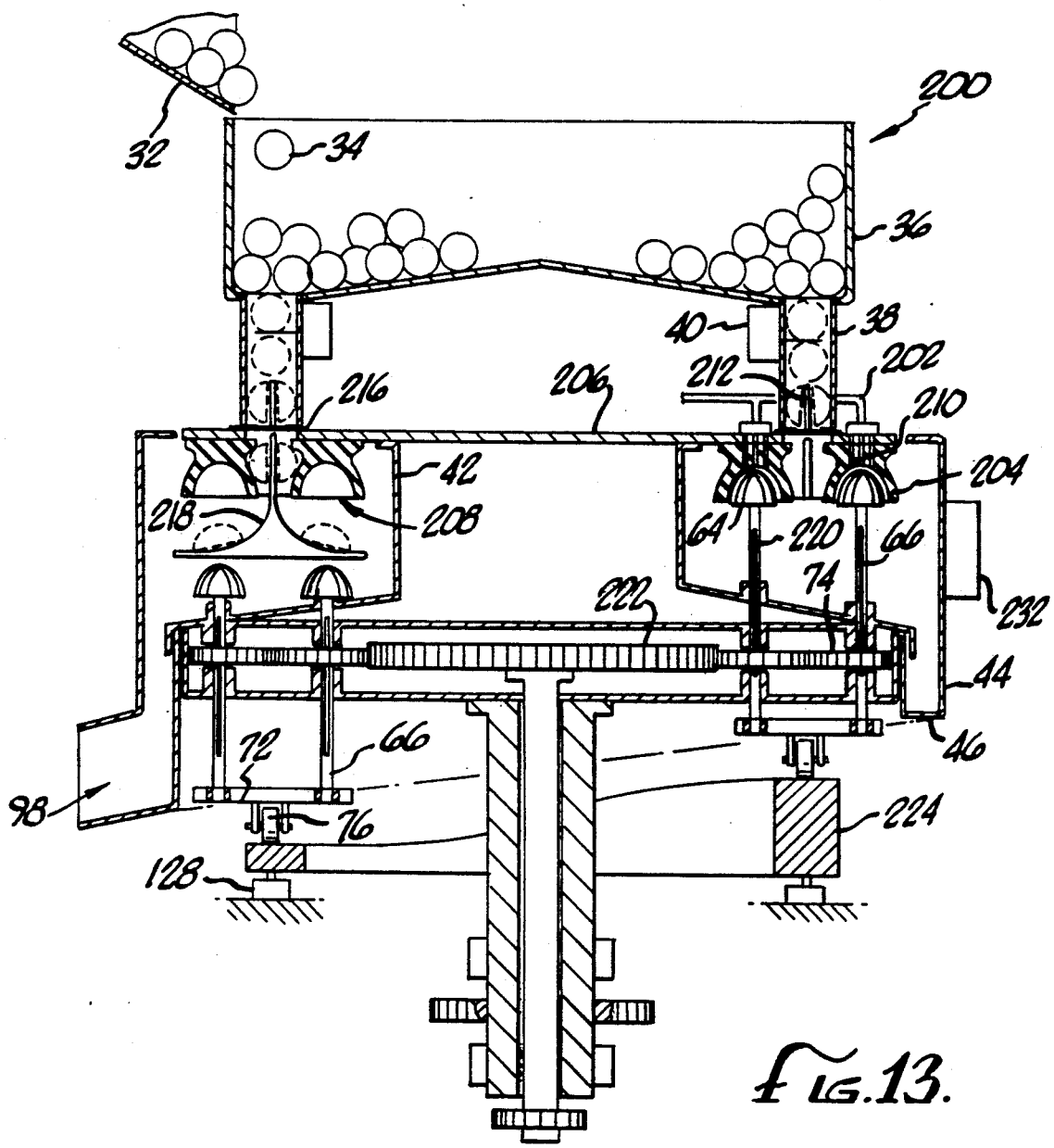
FIG. 13 is a section view fragment of a second embodiment of the present rotary fruit juice extractor.

A fixed cup embodiment extractor 200 is shown in FIG. 13. In this embodiment, the cups 204, preferably made of a soft resilient material, are attached to a frame top plate 206 and do not pivot or rotate with respect to the frame top plate. A vacuum/air supply 202 is connected to the cavity 208 of each cup 204 through openings 210. Reamers 64 are supported on reamer shafts 66 having splines 220 slidably attaching them to gears 74. A cam plate 224 drives cam rollers 76 to move the reamers 64, similar to the embodiment of FIG. 1.

As shown in FIGS. 13-19, a dead plate assembly 212 includes a halving knife 214 attached to a dead plate 216. The dead plate assembly is fixed to the non-rotating housing 44. A loading ramp 218 having 2 longitudinal slots is also fixed to the housing 44.

A sun gear 222 drives the shaft gears 74. The sun gear 222 is relatively thin as it remains in constant vertical alignment with the shaft gears 74 as the reamer shafts 66 advance and retract with rotation of the frame 42. In contrast, in the embodiment of FIG. 1, the drive gears 74 are fixed (against movement in all directions) to the reamer shaft 66, such that the drive gears 74 move up and down along the relatively thick sun gear 78, as the reamers advance and retract.

A spreading ramp 228 is attached at least indirectly to the frame 42 and is positioned in between each pair of cups 204. Cup fingers 230 extend down from the back of each cup 204 and are aligned to pass through the slots in the loading ramp 218.

Juice fraction pans are provided around the outside of the reaming sectors of the extractor 200.

Figure 14:
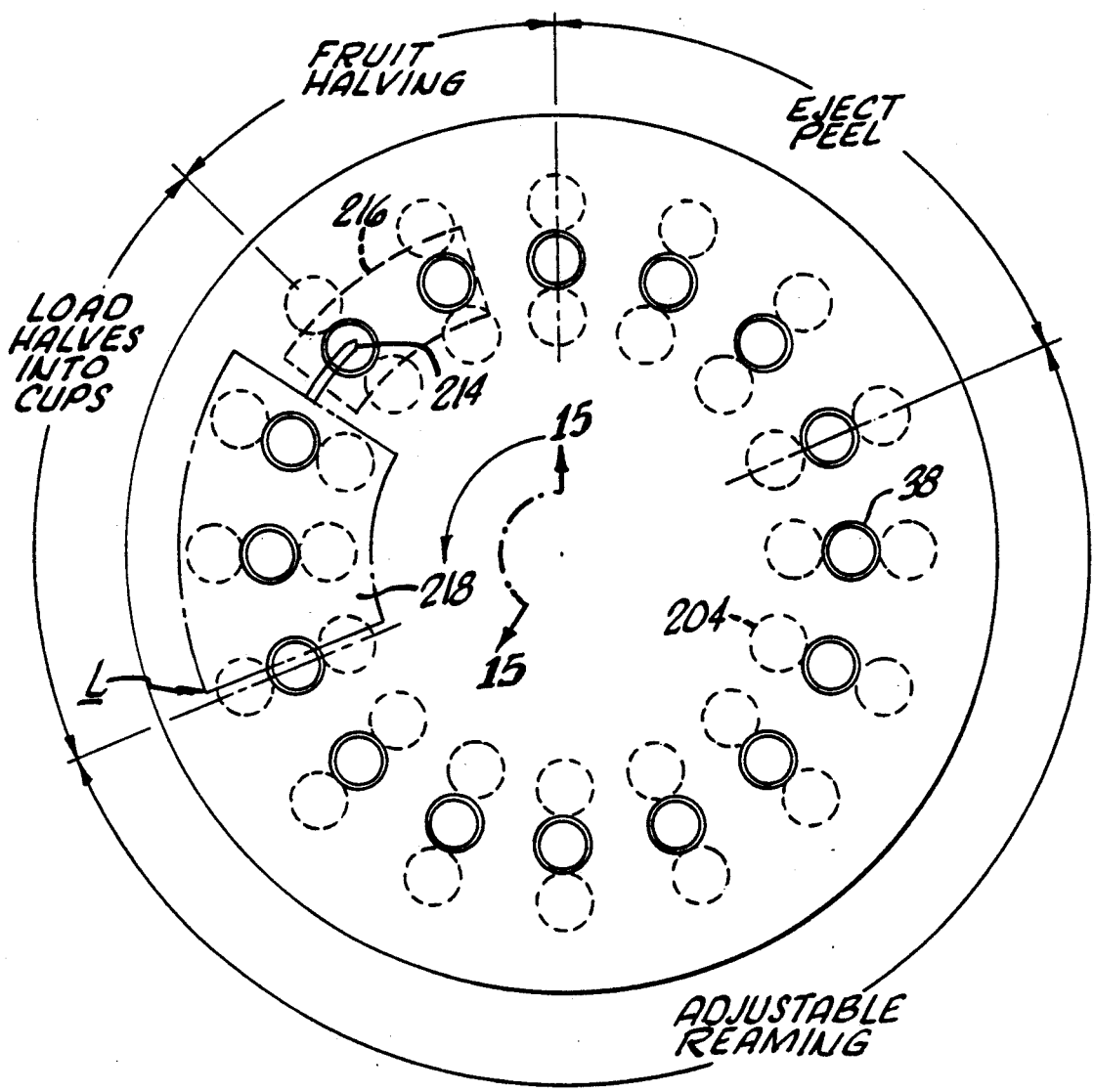
FIG. 14 is a schematically illustrated top view thereof.
Figure 15:
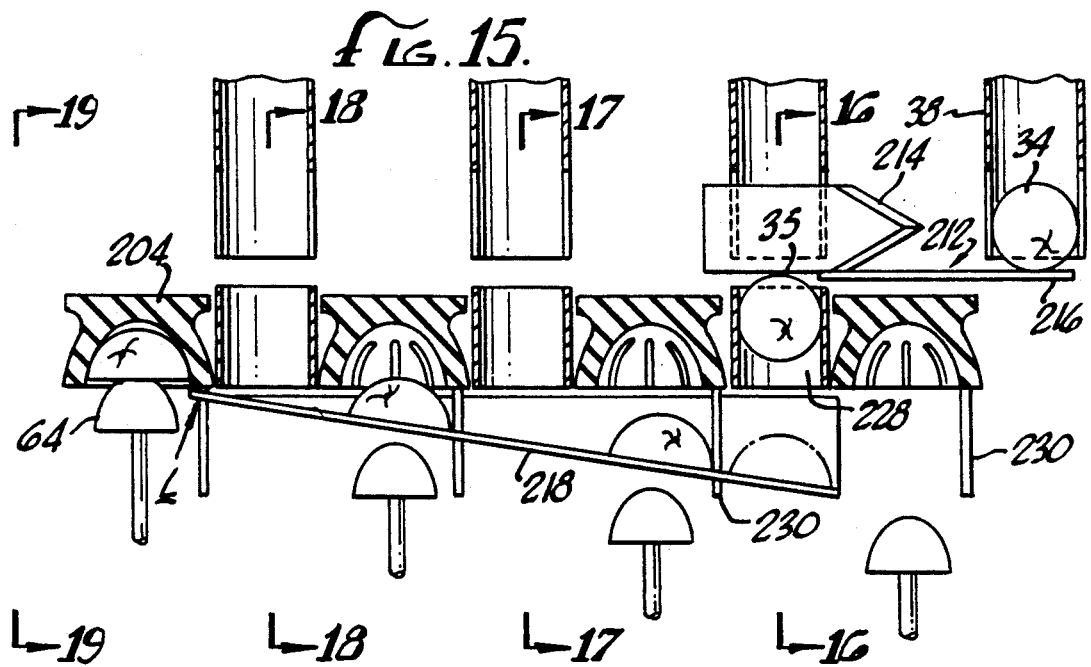
FIG. 15 is a schematically illustrated side section view taken along line 15—15 of FIG. 14.
Figure 16:
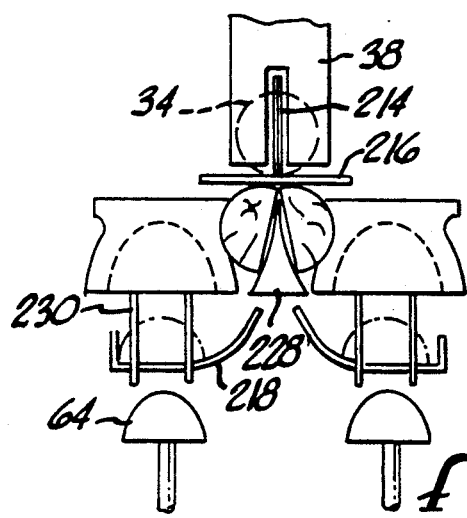
FIG. 16 is a front elevation view fragment taken along line 16—16 of FIG. 15.
Figure 17:
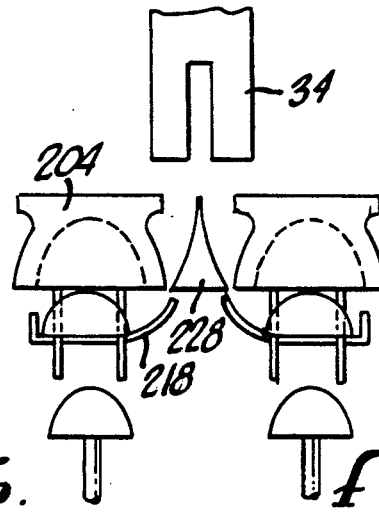
FIG. 17 is a front elevation view fragment taken along line 17—17 of FIG. 15.
Figure 18:
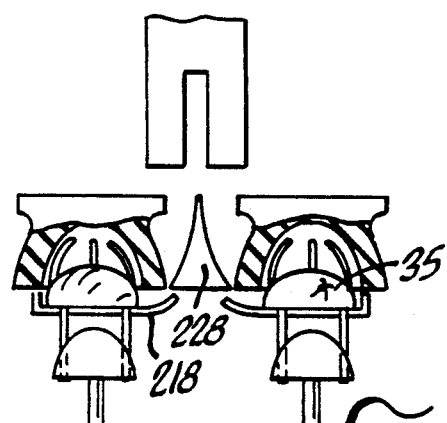
FIG. 18 is a front elevation view fragment in part section taken along line 18—18 of FIG. 15.
Figure 19:
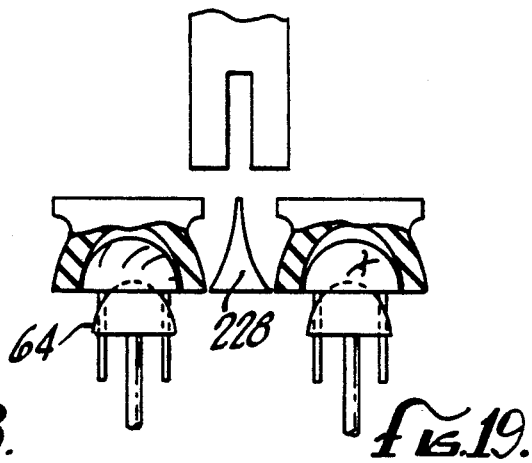
FIG. 19 is a front elevation view fragment in part section taken along line 19—19 of FIG. 15.

In operation, the fruit passes from the hopper 36 into the magazine 38 and is metered by the escapement 40. However, as shown in FIGS. 14 and 15, in extractor 200 the fruit 34 falls onto a dead plate 216 and is advanced with rotation of the frame 42 into the halving knife 214 which passes through slots in the magazines 38 to slice the fruit 34 in half.

The fruit halves 35 fall from the dead plate 216 over a spreading ramp 218 which reorients the fruit halves to a face down position on the loading ramp 218. The cup fingers 230 drive the fruit halves 35 up the loading ramp 218 and into the cups 204. Vacuum is applied to help hold the fruit halves into the cups. At the same time, the reamers 64 are advancing, such that at position L where the loading ramp 218 ends, the reamers 64 are engaging the fruit halves 35 and hold them in place. Reaming, depth control, dwell and adjustment, and peel ejectment can then be achieved as described above for the pivoting cup embodiment 30. Air pressure supplied to the cups can also provide peel ejectment.

Figure 20:
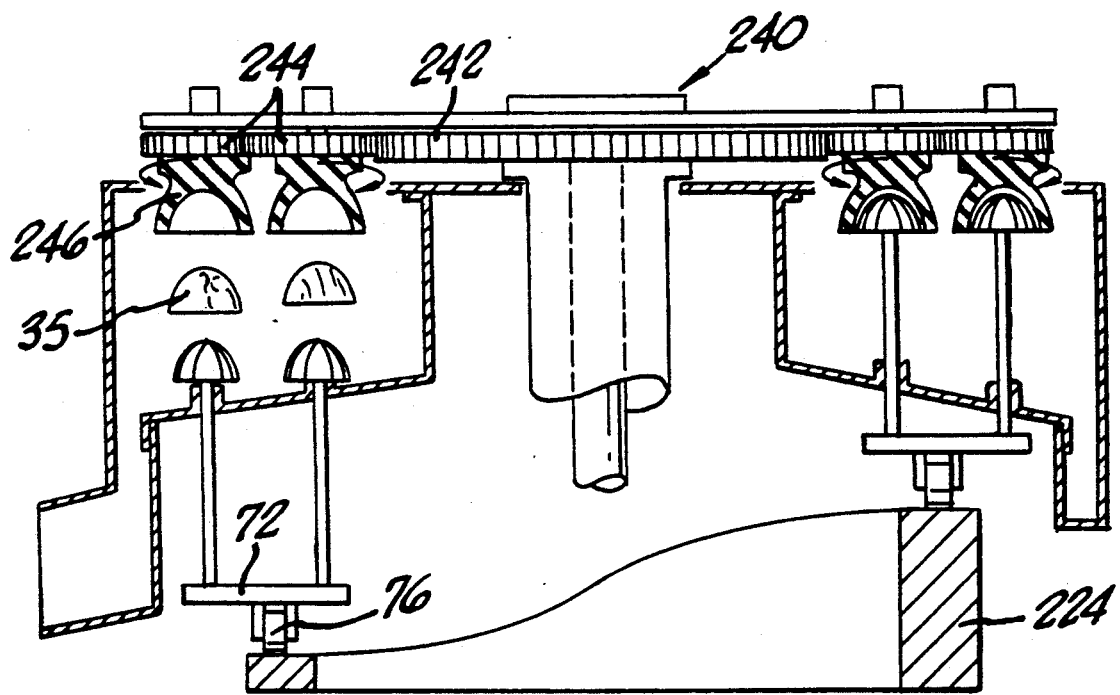
FIG. 20 is a third embodiment of the present rotary fruit juice extractor.

FIG. 20 shows a rotating cup extractor 240 similar to the extractor 200 shown in FIG. 13. In the embodiment of FIG. 20, a sun gear 242 drives cup drive gears 244 attached to cups 246. Reamers 248 do not spin but advance and retract on the cam plate 224.

In the manufacture of some fruit products, it is desirable or advantageous to obtain large pieces of fruit pulp. A coring extractor 250 which extracts a fruit pulp core in a single piece is shown in FIGS. 21-26. As shown in these figures, cups 252 are attached to cup drivers 262 which move the cups together and apart, to alternately hold and release a fruit 34. A capping knife 254 has upper and lower capping blades 256 and 258. A cylindrical coring knife 266 is attached to a coring knife spin drive and advance mechanism (not shown). An ejector 268 is slidably positioned within the coring knife 266 and is linked to an ejector actuator (not shown).

Figure 21:
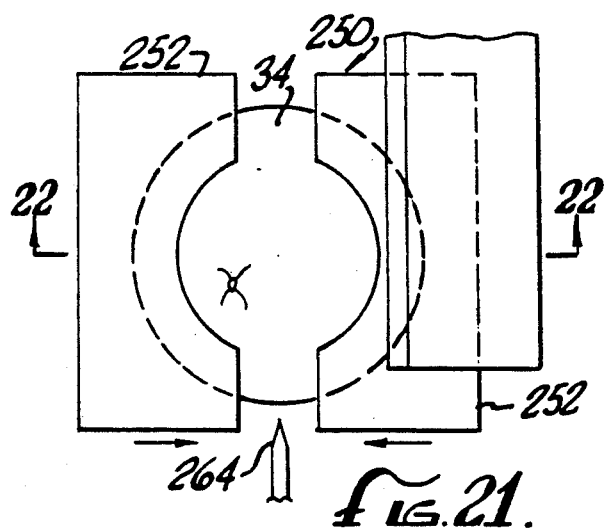
FIG. 21 is a schematically illustrated plan view fragment of a coring extractor.
Figure 22:
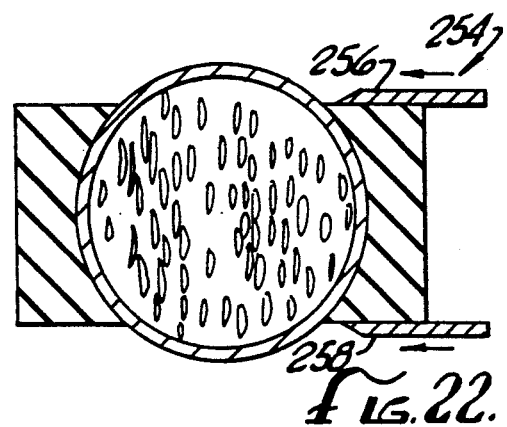
FIG. 22 is a section view fragment taken along line 22—22 of FIG. 21.
Figure 23:
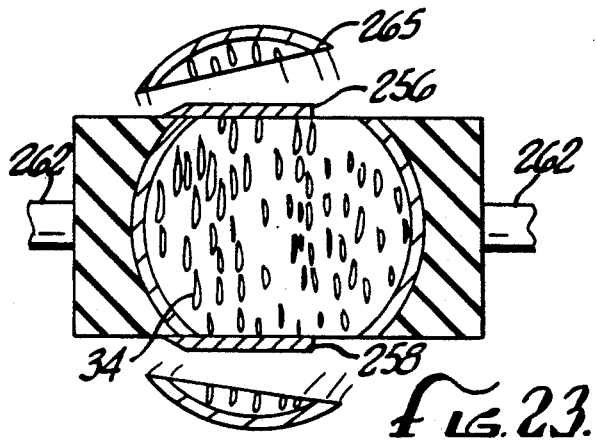
FIG. 23 is a section view fragment illustrating the operation of the capping knife of FIG. 22.
Figure 24:
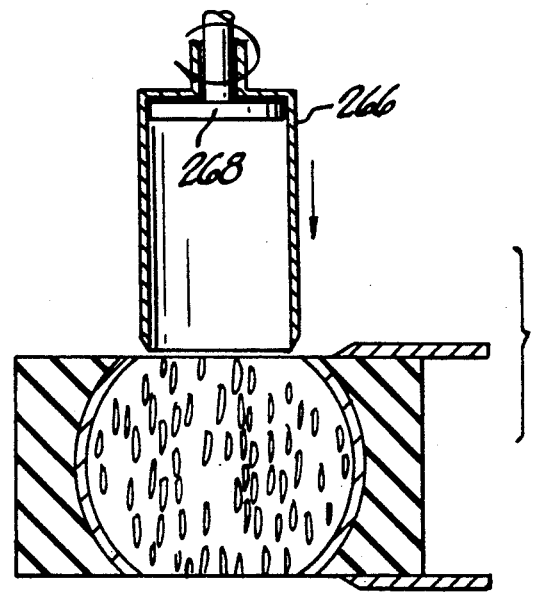
FIG. 24 is a section view fragment thereof showing the coring knife aligned with the fruit pulp.

In operation, the cup drivers 262 close the cups 252 around a fruit 34, as shown in FIGS. 21 and 22. The capping knife 254 is then advanced, with the upper and lower blades 256 and 258 slicing fruit caps 265 from the fruit 34, and exposing the fruit pulp, top and bottom, as shown in FIG. 23. The capping knife 254 is retracted and the capped fruit is brought into alignment with the coring knife 266, as shown in FIG. 24.

Figure 25:
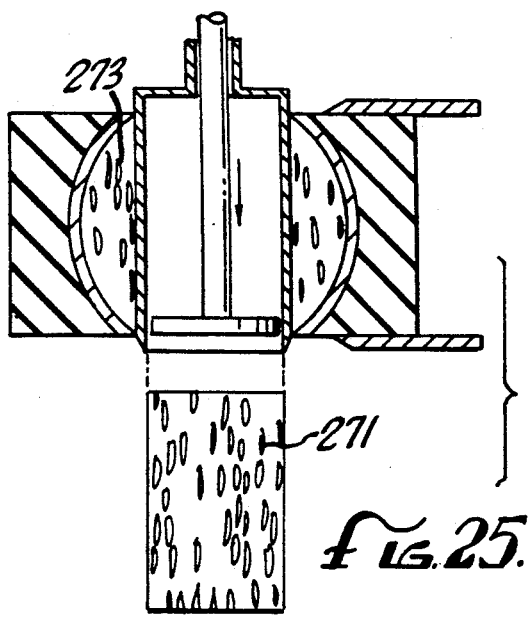
FIG. 25 is a section view fragment thereof showing the coring and extraction operation.
Figure 26:
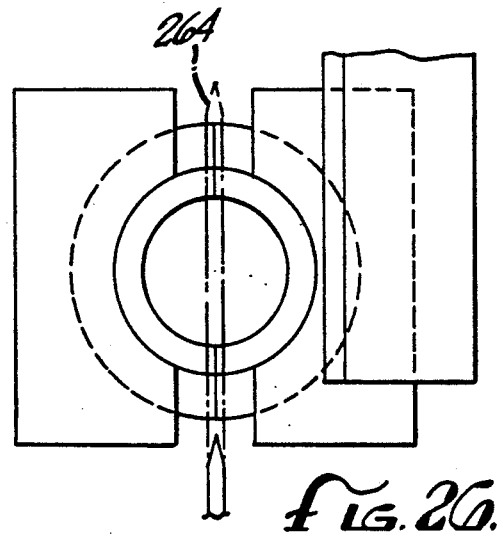
FIG. 26 is a plan view fragment thereof showing operation of a halving knife of the coring extractor.

The spinning coring knife 266 is advanced into and through the capped fruit, thereby cutting away a pulp core 271. After the coring knife 266 has passed entirely through the capped fruit, the ejector 268 is advanced to eject the fruit core 271 from the coring knife 266, as shown in FIG. 25. The ejector 268 and coring knife 266 are withdrawn from the cored fruit and a halving knife 264 advances through the cored fruit in between the cups 252, as shown in FIG. 26. The cup drivers 262 move the cups 252 apart and the cored fruit halves are ejected from the cups, in preparation for receipt of another fruit.

The coring extractor 250 can be configured into a rotary design similar to the designs shown in FIGS. 1 and 13, with cams operating the cup drivers 262, capping knife 254, coring knife 266, ejector 268 and the halving knife 264. Alternatively, the extractor 250 can also be used in various non-rotating extractor configurations.

Figure 27:
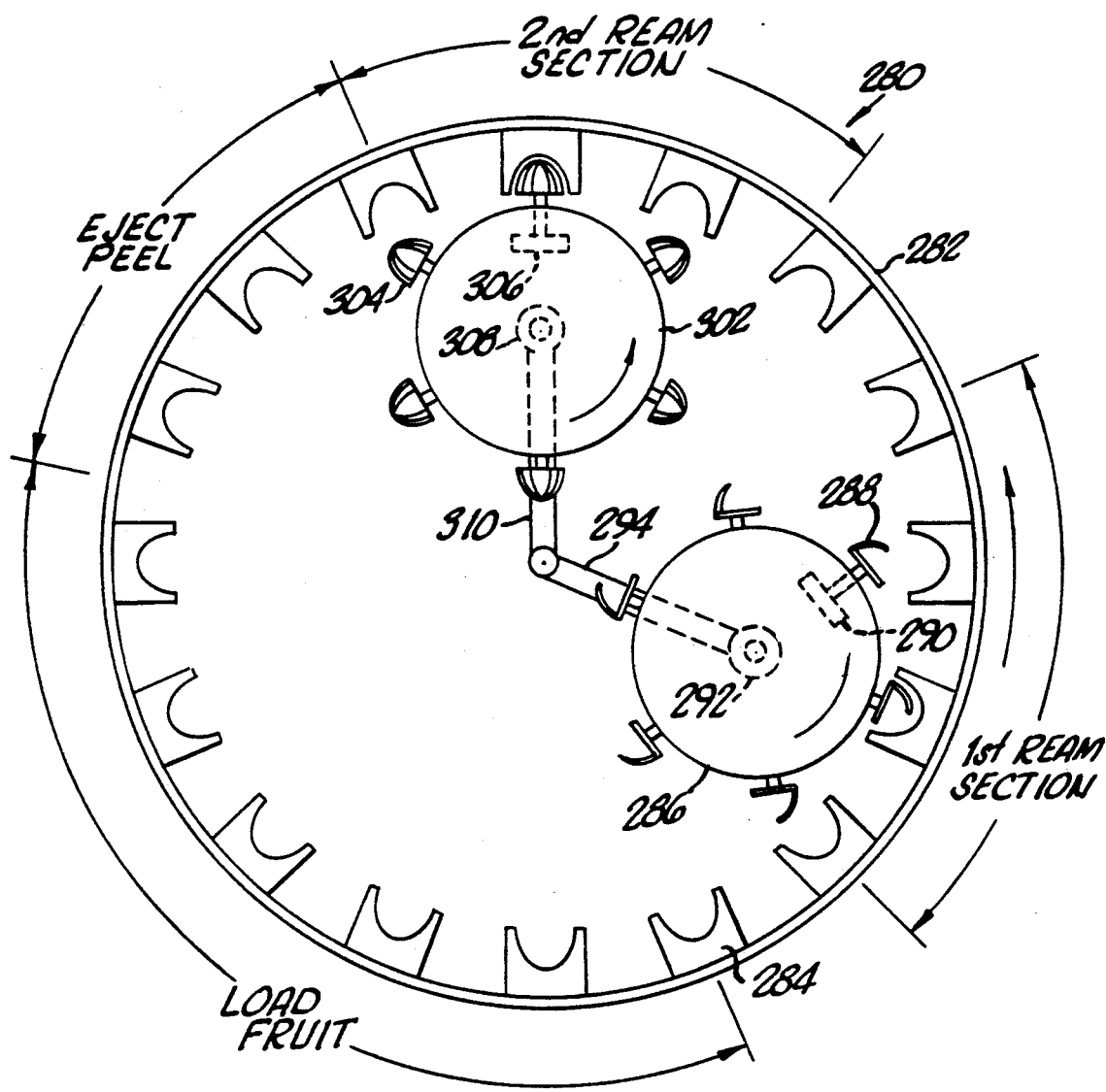
FIG. 27 is a schematically illustrated plan view fragment showing a fourth embodiment for fruit pulp extraction and juice reaming.

Rotary fruit and fruit juice extractors having horizontally oriented cups have been known and used in the past. FIG. 27 shows an improved horizontal combination slicer and reamer 280. Horizontal cups 284 are attached to a rotatable cup ring 282. A slicer wheel 286 is fixed in position within the cup ring 282 on a slicer wheel arm 294. The slicer wheel has a plurality of slicers 288 rotated by a slicer drive 290 within the slicer wheel 286. The slicers 288 may be similar to the slicing knife 152 shown in FIG. 12. A ream wheel 302 is mounted on a reamer wheel arm 310 positioned at a fixed angle from the slicer wheel arm 294. A plurality of reamers 304 are equally spaced apart and extend radially outwardly from the reamer wheel 302. A reamer drive 306 spins the reamers 304. The spacing between each slicer 288 on the slicer wheel 286 and each reamer 304 on the reamer wheel 302 is set to correspond to the spacing between the cups 284 on the cup ring 282.

In operation, fruit halves (not shown) are loaded into the horizontal cups 284 which are moving with the cup ring 282. The slicer wheel 286 and reamer wheel 302 remain fixed in position with respect to each other and to the extractor housing, while the cup ring 282 rotates about them. The slicer wheel 286 and reamer wheel 302 are rotated about their axes by a slicer wheel drive 292 and a reamer wheel drive 308.

The fruit halves first pass by the slicer wheel 286 and a slicer 288 slices fruit pulp from the fruit half. With rotation of the cup ring 282, the fruit half then proceeds to the reamer wheel 302 and a reamer 304 reams the fruit half.

Thus, while several embodiments have been shown and described, it will be apparent that many other modifications may be made without departing from the spirit and scope of the present invention.

What is claimed is:

1. A rotary fruit juice extractor comprising:

a frame;
a plurality of pairs of holding cups pivotally mounted on the frame;
means for pivoting the cups;
a plurality of pairs of reamers with each reamer in fixed alignment with a corresponding cup; and
means for relatively moving the reamers and cups substantially straight towards and away from each other.

2. The extractor of claim 1 wherein the means for pivoting the cups is actuated by rotation of the frame.

3. The extractor of claim 2 wherein the means for pivoting the cups comprises a cam.

4. The extractor of claim 1 wherein the means for moving comprises a cam.

5. The extractor of claim 4 further comprising means for turning the frame.

6. The extractor of claim 4 wherein the means for moving the reamers and cups towards and away from each other comprises a reamer advance cam.

7. The extractor of claim 1 wherein the cups are pivotable respectively from a fruit loading position, to a fruit halving position, and to a fruit reaming position with rotation of the frame.

8. The extractor of claim 7 wherein the cups have an angle of elevation of from 5°-20° below horizontal when in the cutting position.

9. The extractor of claim 1 further comprising:
a rotary fruit magazine attached to and rotatable with the frame; and
a plurality of feed chutes attached to the magazine, with one feed chute aligned in a fixed position over each pair of pivoting cups.

10. The extractor of claim 1 wherein the cups of each pair are substantially identical in size and shape and have pivot axes which are equidistant from the feed chute.

11. The extractor of claim 1 further comprising a gear system for rotating the reamers independently of the rotatable frame.

12. The extractor of claim 1 further comprising a fixed juice pan at least partially surrounding the rotatable frame and having a plurality of juice fraction collecting sections.

13. The extractor of claim 1 wherein the each pair of cups includes an inner cup positioned on an inner circle and an outer cup positioned on an outer circle, further comprising a fixed halving knife positioned in between the inner circle and the outer circle.

14. The extractor of claim 13 further comprising a fruit half retainer plate attached to the halving knife.

15. The extractor of claim 1 further comprising a fruit halving knife having a leading point positioned to centrally engage and slice a fruit held by a pair of holding cups.

16. A rotary fuit juice extractor for generally round fruit, comprising:
an extractor housing;
a halving knife attached to the housing for slicing the fruit in half;
a rotor rotatable within the housing;
a plurality of reamers circumferentially spaced apart on the rotor;
a plurality of cups for holding sliced fruit halves, circumferentially spaced apart on the rotor and axially aligned with the reamers;
means for moving the reamers and cups straight towards and away from one another so that the reamers perpendicularly engage the sliced fruit halves; and
means for relatively rotating cups and reamers.

17. The extractor of claim 16 wherein the means for moving the reamers and cups towards and away from each other comprises a cam plate and at least one cam plate elevator.

18. An apparatus for juicing fruit comprising:
a housing;
a rotatable frame positioned at least partially within the housing;
a plurality of pairs of holding cups pivotally supported on the frame, each pair of cups having an inner cup aligned on an inner cup circle, and an outer cup aligned on an outer cup circle;
means for rotating the frame;
means for separately pivoting each pair of holding cups;
a plurality of pairs of reamers aligned with the plurality of pairs of cups;
means for relatively rotating the cups and reamers;
means for advancing and retracting the reamers towards and away from the cups; and
a fixed halving knife positioned between the inner cup circle and outer cup circle.

19. The apparatus of claim 18 wherein the halving knife has a knife center point and two diverging knife edges.

20. The apparatus of claim 19 wherein the center point of the halving knife is vertically positioned at an elevation intersected by the axis of a cup extending approximately 5°-10° below horizontal.

21. The apparatus of claim 18 wherein the cups on the outer circle are radially aligned with the cups on the inner circle.

22. A fruit juice extractor comprising:
a housing;
a frame rotatable mounted at least partially within the housing, the frame having an upper end including a fruit magazine, with a plurality of equally spaced-apart feed chutes attached to the magazine;
a plurality of pairs of holding cups pivotally mounted to the frame, each pair of cups associated with a feed chute;
a fixed cam base plate including a reamer advance cam located between inner and outer cup pivoting cams;
a plurality of pairs of reamers rotatably supported on the frame below and aligned with, the pairs of holding cups, each pair of reamers having a cam follower engageable to the reamer advance cam;
a drive rod linked to each cup and having a cam follower engageable to one of the cup pivoting cams; and
a gear drive system for rotating the reamers.

23. A fruit processing machine comprising:
a frame;
a plurality of pairs of non-rotating holding cups mounted on the frame and pivotable between a partially up facing fruit loading position and a substantially down facing fruit reaming position;
means for pivoting the cups from the loading position to the reaming position and back to the loading position;
a plurality of rotatable reamers supported by the frame, with one reamer associated with each cup;
means for relatively moving the reamers and cups towards and away from each other; and
means for rotating the reamers.

24. The machine of claim 23 wherein the means for relatively moving the reamers and cups relatively moves the reamers and cups towards and away from each other along a straight line.

* * * * *